United States Patent
Gillard et al.

(10) Patent No.: US 6,710,117 B2
(45) Date of Patent: Mar. 23, 2004

(54) MARINE PAINT COMPOSITIONS

(75) Inventors: Michel Gillard, Corroy-le-Chateau (BE); Marcel Vos, Nivelles (BE); Jos G. M. Prinsen, Bussum (NL)

(73) Assignee: Sigma Coatings B.V., Uithorn (NL)

( * ) Notice: Subject to any disclaimer, the term of this patent is extended or adjusted under 35 U.S.C. 154(b) by 0 days.

(21) Appl. No.: 10/204,491

(22) PCT Filed: Feb. 22, 2001

(86) PCT No.: PCT/EP01/02172

§ 371 (c)(1),
(2), (4) Date: Jan. 13, 2003

(87) PCT Pub. No.: WO01/62858

PCT Pub. Date: Aug. 30, 2001

(65) Prior Publication Data

US 2003/0166768 A1 Sep. 4, 2003

(30) Foreign Application Priority Data

Feb. 25, 2000 (EP) .............................. 00200666

(51) Int. Cl.$^7$ .............................. C08L 33/00; C09D 5/16
(52) U.S. Cl. ...................... 524/523; 524/515; 524/516; 524/530; 524/533
(58) Field of Search ................. 524/515, 516, 524/523, 530, 533

(56) References Cited

U.S. PATENT DOCUMENTS

| 4,526,932 | A | * | 7/1985 | Imazaki et al. | .......... | 525/326.7 |
| 4,654,380 | A | * | 3/1987 | Makepeace | ................. | 523/122 |
| 5,786,392 | A | * | 7/1998 | Silverman et al. | ....... | 514/772.4 |
| 5,891,935 | A | * | 4/1999 | Schneider | ................... | 523/177 |

FOREIGN PATENT DOCUMENTS

EP 0747446 12/1996

* cited by examiner

Primary Examiner—Helen L. Pezzuto
(74) Attorney, Agent, or Firm—Goodwin Procter LLP

(57) ABSTRACT

Marine paint composition comprising: a first polymer comprising from 20 to 70 wt % of monomer units A of at least one hydrolysable either tin or silicium ester of an olefinically unsaturated carboxylic acid or salt of copper, zinc, calcium of an olefinically unsaturated carboxylic acid, the balance being monomer units C selected from the group consisting of esters of ethylenically unsaturated carboxylic acids with C1–C18 alcohols, styrene, alpha-methyl styrene, vinyl toluenes, and mixtures thereof; a second polymer comprising from 5 to 40 wt % of at least one monomer B selected from the group consisting of the N-vinyl lactam monomers of general formula $CH_2=CH-NR'''''-CO-R'$, the N-vinyl amides of general formula $CH_2=CH-N-CO-R''$, the monomer of general formula $CH_2=CR'''-COO-R''''-NR'''''-CO-R'$, the monomers of general formula $CH_2=CR'''-COO-R''''-N-CO-R''$, 2-pyrrolidone-1-isoprenyl ketone, and mixtures thereof, wherein R' is a n-alkylidene radical having 2 to 8 carbon atoms, R'' is selected from the group consisting of alkyl, cycloalkyl, aryl, alkylaryl and arylalkyl radicals having a maximum of 18 carbon atoms, R''' is H or $CH_3$, R'''' is a n-alkylidene radical having from 1 to 8 carbon atoms, R''''' is H or R'', the balance being monomer units C selected from the group consisting of esters of ethylenically unsaturated carboxylic acids with $C_1-C_{18}$ alcohols, styrene, alpha-methyl styrene, vinyl toluenes, and mixtures thereof; at least one antifoulant; the ratio of the first polymer comprising monomer units A to the second polymer comprising monomer units B being of from 95:5 to 10:90.

10 Claims, No Drawings

MARINE PAINT COMPOSITIONS

CROSS REFERENCE TO RELATED APPLICATIONS

This application is a national phase application of International Application No. PCT/EP01/02172, which was filed on Feb. 22, 2001 and which published in English on Aug. 30, 2001, which in turn claims priority from European Application No. 00200666.6, which was filed on Feb. 25, 2000.

BACKGROUND OF THE INVENTION

This invention relates to marine anti-fouling (AF) paints generally used as topcoat paints for ships' hull, particularly to marine anti-fouling paints that polish at a predetermined rate and to a polymeric composition for a marine anti-fouling paint that hydrolyses at a predetermined rate in the presence of sea water.

The performance of a ship falls off, when marine organisms grow on the submarine part of the hull.

Applying to the hull a topcoat paint comprising anti-fouling agents controls the extent of marine fouling. The anti-fouling agents are biocides that are freed from the paint surface at a rate such that their concentration is lethal to marine organisms.

The use of self polishing copolymer (SPC) systems is nowadays the leading technology to protect ship hulls against fouling: in these systems the interaction with sea water produces soluble species but bulk hydrophobicity confines reaction to sea-water interface (ca 5 $\mu$m). This ~5 $\mu$m leach layer is maintained throughout coating lifetime. This results in a zero order release rate and so the lifetime is directly related to film thickness.

The best known SPC antifoulings are based on tributyltin (TBT) (meth)acrylate copolymers. EP-A-51930 is a milestone patent disclosing such TBT copolymers. The "self-polishing" action (rate is dependent on TBT content) leads to decrease in hull roughness during service. TBT systems have dominated the antifouling market for the last 20 years.

By 1987, tributyltin (TBT) had been shown to leach into the water (it is indeed a potent marine biocide which gives an enhanced anti-fouling effect), harming sea life, possibly entering the food chain, and causing deformations in oysters and sex changes in whelks. Its use was banned for use on vessels with hulls of 25 m or less, but the 1987 ruling left an essential exemption for larger vessels until alternatives were found. In addition, many countries have implemented a maximum limit for the TBT release of antifoulings used on vessels with hulls that are longer than 25 m. The most frequently used limit is that of 4 $\mu$g/cm$^2$/day determined according ASTM D 5108-90.

These restrictions have resulted in new developments such as described for example in European patent EP-B-0, 218,573 that discloses a marine paint comprising a film-forming polymer, prepared by polymerisation of monomer units A of at least one triorganotin salt of an olefinically unsaturated carboxylic acid and at least one comonomer B selected from the group comprising vinylpyrrolidone, vinylpiperidone and vinylcaprolactam, the balance being at least one C1–C4 alkylmethacrylate and/or styrene comonomer C.

The ban on TBT in Japan will become world wide in the near future and has lead to many TBT-free developments as well:

EP-B-289 481 and EP-B-526 441 discloses marine paint compositions based on rosin or its copper or zinc derivatives and a copolymer of alkyl methacrylates and/or styrene with comonomers which are cyclic tertiary amides or imides having an alkenyl group.

EP-A-342 276 relates to the preparation of metal (preferably zinc or copper) containing resin composition which is characterised by having hydrolysable metal ester bonding at the end portion of pendant chain. GB 2 311 070 also describes a composition comprising a resin having at least one metal carboxylate.

EP-B-0131 626 describes antifouling paints based on film-forming water insoluble, seawater erodible, polymeric binders containing trialkylsilyl (meth)acrylates; EP-A-755 733 discloses antifouling coating compositions based on such a trialkylsilyl esters containing copolymer and a chlorinated paraffin.

There is however still a need in the art for improved erodible anti-fouling paint compositions.

SUMMARY OF THE INVENTION

An object of the present invention is to provide such improved self-polishing and anti-fouling paint compositions for use as topcoat paints for ships' hull.

Another object of the invention is to provide improved polymeric binders for a marine anti-fouling paint that hydrolyses at a predetermined rate in the presence of sea-water.

A yet further object of the present invention is to provide an anti-fouling marine paint composition with a high solids content.

Accordingly, the present invention provides a marine paint comprising essentially:

a first polymer comprising from 20 to 70 wt % of monomer units A of at least one hydrolysable either tin or silicium ester of an olefinically unsaturated carboxylic acid or salt of copper, zinc, calcium of an olefinically unsaturated carboxylic acid, the balance of the monomer units being monomer units C selected from the group consisting of the esters of ethylenically unsaturated carboxylic acids with C1–C18 alcohols, styrene, alpha-methyl styrene, vinyl toluenes, and mixtures thereof.

a second polymer comprising from 5 to 40 wt % of at least one comonomer B selected from the group consisting of the N-vinyl lactam monomers of general formula CH2=CH—NR''''—CO—R', the N-vinyl amides of general formula CH2=CH—N—CO—R'', the monomers of general formula CH2=CR'''—COO—R''''—NR''''—CO—R', the monomers of general formula CH2=CR'—COO—R''''—N—CO—R'', 2-pyrrolidone-1-isoprenyl ketone, and mixtures thereof, wherein R' is a n-alkylidene radical having 2 to 8 carbon atoms, R'' is selected from the group consisting of alkyl, cycloalkyl, aryl, alkylaryl and arylalkyl radicals having a maximum of 18 carbon atoms, R''' is H or CH3, R'''' is a n-alkylidene radical having from 1 to 8 carbon atoms, R''''' is H or R'', and the balance of the monomer units being monomer units C selected from the group consisting of the esters of ethylenically unsaturated carboxylic acids with C1–C18 alcohols, styrene, alpha-methyl styrene, vinyl toluenes, and mixtures thereof.

At least one antifoulant.

The relative ratio of the first polymer comprising monomer units A to the second polymer comprising monomer units B is from 95:5 to 10:90.

Whilst not wishing to be bound by a theory, it is believed that the two polymeric binders are sufficiently compatible to produce a stable paint composition but sufficiently incompatible to give such structure to the paint that it can be applied in desired layer thicknesses. There will thus be less need to add thixotropic agents in order to obtain a suitable structure. It is known in the art that the solids content of a paint composition decreases when the amount of thixotropic agent increases; the paint compositions of the present invention will thus keep a high solids content.

The applicant has now unexpectedly found that placing monomer units A and monomer units B respectively on two separate binders that are marginally compatible, produces a paint composition with an improved compromise of the following properties:

a suitable structure indicated by the thixotropic factor;

a high solids content;

a suitable polishing rate;

little or no blistering or flaking or detachment;

good can stability.

DETAILED DESCRIPTION OF THE INVENTION

In a first embodiment, the monomer units A used in the first polymer are of the formula $R_3SnOOCCR'=CH_2$ or $R_3SiOOCCR'=CH_2$, wherein each R is an alkyl radical containing from 2 to 8 carbon atoms, or an aryl or aralkyl radical, R' is H or $CH_3$. The groups R can be different but are preferably the same.

The first polymer comprises from 20 to 70 wt % of monomer units A, preferably from 30 to 65 wt %, and more preferably from 50 to 60 wt %, the balance being monomer units C.

In another embodiment of the present invention, the first polymer comprising monomer units A is a metal containing resin composition that can be obtained as described in EP-A-342276 by reacting a mixture of an acid group containing base resin, comprising essentially monomer units C and olefinically unsaturated carboxylic acids monomer units corresponding to monomer unit A;

a metallic salt of low boiling organic basic acid and a high boiling organic monobasic acid at elevated temperature while removing the formed low boiling organic basic acid out of the system.

The metals are selected from the zinc, copper or calcium.

The acid group containing base resin has an acid value of from 25 to 350 mg KOH/g, the low boiling organic basic acid has a boiling point of from 100 to 240° C. and the high boiling organic monobasic acid has a boiling point that is at least 20° C. higher than the boiling point of said low boiling organic basic acid.

In yet another embodiment of the present invention, the first polymer comprising monomer units A has a number average molecular weight of from 1000 to 50000, and contains from 20 to 65 wt % of structural units derived from trialkylsilyl ester of polymerisable unsaturated carboxylic acid, as described in EP-A-775733.

Monomer units B can be N-vinyl lactam monomers of general formula $CH2=CH-N-CO-R'$, wherein R' is a n-alkylidene radical having 2 to 8 carbon atoms, preferably 2 to 4 carbon atoms, more preferably 3 carbon atoms The most preferred monomer unit B is N-vinyl pyrrolidone.

Monomer units B can also be N-vinyl amides of general formula $CH2=CH-N-CO-R''$, wherein R'' is selected from the group consisting of alkyl, cycloalkyl, aryl, alkylaryl and arylalkyl radicals having a maximum of 18 carbon atoms, preferably 2 to 12 carbon atoms, more preferably 2 to 6 carbon atoms.

Monomer units B can further be monomers of general formula $CH2=CR'''-COO-R''''-NR''''''-CO-R'$, wherein R''' is H or $CH3$, R'''' is R'' (as defined above) preferably H, R' is a n-alkylidene radical having 2 to 8 carbon but preferably such that the terminal cycle is 2-pyrrolidone. Preferably, R''' is $CH3$; examples of such monomers are described in Polymer 39(17), 4165–9, 1998.

Monomer units B can still further be monomers of general formula $CH2=CR'''-COO-R''''-N-CO-R''$, wherein R''' is H or $CH3$, R'''' is a n-alkylidene radical having from 1 to 8 carbon atoms, and R'' is selected from the group consisting of alkyl, cycloalkyl, aryl, alkylaryl and arylalkyl radicals having a maximum of 18 carbon atoms.

Preferably the N-vinyl lactams are being used, more preferably N-vinylpyrrolidone The second polymer comprises from 5 to 40 wt % of monomer units B, preferably from 10 to 30 wt % and more preferably from 15 to 30 wt %.

Monomer units C are preferably selected from the group consisting of the esters of ethylenically unsaturated carboxylic acids with C1–C18 alcohols, styrene, alpha-methyl styrene, vinyl toluenes, and mixtures thereof.

The ethylenically unsaturated carboxylic acid is more preferably selected from the group consisting of acrylic acid, methacrylic acid, maleic acid, fumaric acid, and mixtures thereof, most preferably selected from the group consisting of acrylic acid, methacrylic acid, and mixtures thereof. The alcohol may be an aliphatic or a cycloaliphatic alcohol, and it may be linear or branched; it is more preferably selected from C1–C10 alcohols, more preferably from C1–C4 alcohols, most preferably from C1–C2 alcohols. Typical examples of monomer units of the ester type are stearyl (meth)acrylate, isobornyl (meth)acrylate, lauryl methacrylate, n-butyl (meth)acrylate, isobutyl (meth)acrylate, ethyl (meth)acrylate and methyl (meth)acrylate.

The polymer can be prepared by addition polymerisation of the appropriate monomers in the appropriate proportions at polymerisation conditions using a free radical catalyst such as e.g. benzoyl peroxide, tert-butyl peroxy 2-ethyl hexanoate (TBPEH), t-butyl peroxybenzoate (TBP), or azobisisobutyronitrile. The reaction is carried out in an organic solvent such as e.g. xylene, toluene, butyl acetate, n-butanol, 2-ethoxyethanol, cyclohexanone, 2-methoxyethanol, 2-butoxyethanol, 2-ethoxyethyl acetate, N-methyl pyrrolidone, dimethylformamide and mixtures thereof.

Polymerisation is preferably carried out at a temperature in the range of 70–140° C. although higher temperatures may be used providing that the solvent and the catalyst are adapted thereto. Within this range the use of higher temperatures produces polymers of lower molecular weight. Polymerisation may be carried out by heating all the polymer ingredients in the solvent or preferably by gradually adding the monomers and catalyst to the heated solvent. The latter procedure produces polymers of lower molecular weight.

The ratio of the two polymers used to prepare the paint composition can vary over a broad range of values depending upon the desired properties of the composition. The relative ratio of the first polymer comprising monomer units A to the second polymer comprising monomer units B is from 95:5 to 10:90, preferably from 80:20 to 40:60.

The antifoulant used as the other essential component in the coating composition of the present invention may be any of conventionally known antifoulants. The known antifoulants are roughly divided into inorganic compounds, metal-containing organic compounds, and metal-free organic compounds.

Examples of the inorganic compounds include copper compounds (e.g. copper sulfate, copper powder, cuprous thiocyanate, copper carbonate, copper chloride, and the traditionally preferred cuprous oxide), zinc sulfate, zinc oxide, nickel sulfate, and copper nickel alloys.

Examples of the metal-containing organic compounds include organo-copper compounds, organo-nickel compounds, and organo-zinc compounds. Also usable are manganese ethylene bis dithiocarbamate (maneb), propineb, and the like. Examples of the organo-copper compounds include copper nonylphenolsulphonate, copper bis (ethylenediamine) bis(dodecylbenzenesulphonate), copper acetate, copper naphtenate, copper pyrithione and copper bis(pentachlorophenolate). Examples of the organo-nickel compounds include nickel acetate and nickel dimethyldithiocarbamate. Examples of the organo-zinc compounds include zinc acetate, zinc carbamate, bis (dimethylcarbamoyl) zinc ethylene-bis(dithiocarbamate), zinc dimethyidithiocarbamate, zinc pyrithione, and zinc ethylene-bis(dithiocarbamate). As an example of mixed metal-containing organic compound, one can cite (polymeric) manganese ethylene bis dithiocarbamate complexed with zinc salt (mancozeb).

Examples of the metal-free organic compounds include N-trihalomethylthiophthalimides, trihalomethylthiosulphamides, dithiocarbamic acids, N-arylmaleimides, 3-(substituted amino)-1,3 thiazolidine-2,4-diones, dithiocyano compounds, triazine compounds, oxathiazines and others.

Examples of the N-trihalomethylthiophthalimides include N-trichloromethylthiophthalimide and N-fluorodichloromethylthiophthalimide. Examples of the dithiocarbamic acids include bis(dimethylthiocarbamoyl) disulphide, ammonium N-methyidithiocarbamate and ammonium ethylene-bis(dithiocarbamate).

Examples of trihalomethylthiosulphamides include N-(dichlorofluoromethylthio)-N',N'-dimethyl-N-phenylsulphamide and N-(dichlorofluoromethylthio)-N',N'-dimethyl-N-(4-methylphenyl)sulphamide.

Examples of the N-arylmaleimides include N-(2,4,6-trichlorophenyl)maleimide, N-4 tolylmaleimide, N-3 chlorophenylmaleimide, N-(4-n-butylphenyl)maleimide, N-(anilinophenyl)maleimide, and N-(2,3-xylyl)maleimide.

Examples of the 3-(substituted amino)-1,3-thiazolidine-2,4-diones include 2-(thiocyanomethylthio)-benzothiazole, 3-benzylideneamino-1,3-thiazolidine-2,4-dione, 3-(4-methylbenzylideneamino)-1,3-thiazolidine-2,4-dione, 3-(2-hydroxybenzylideneamino)-1,3-thiazolidine-2,4-dione, 3-(4-dimethylaminobenzylideamino)-1,3-thiazolidine-2,4-dione, and 3-(2,4-dichlorobenzylideneamino)-1,3-thiazolidine-2,4-dione.

Examples of the dithiocyano compounds include dithiocyanomethane, dithiocyanoethane, and 2,5-dithiocyanothiophene.

Examples of the triazine compounds include 2-methylthio-4-butylamino-6-cyclopropylamino-s-triazine.

Examples of oxathiazines include 1,4,2-oxathiazines and their mono- and di-oxides such as disclosed in PCT patent WO 98/05719: mono- and di-oxides of 1,4,2-oxathiazines with a substituent in the 3 position representing (a) phenyl; phenyl substituted with 1 to 3 substituents independently selected from hydroxyl, halo, C1–12 alkyl, C5–6 cycloalkyl, trihalomethyl, phenyl, C1–C5 alkoxy, C1–5 alkylthio, tetrahydropyranyloxy, phenoxy, C1–4 alkylcarbonyl, phenylcarbonyl, C1–4 alkylsulfinyl, carboxy or its alkali metal salt, C1–4 alkoxycarbonyl, C1–4 alkylaminocarbonyl, phenylaminocarbonyl, tolylaminocarbonyl, morpholinocarbonyl, amino, nitro, cyano, dioxolanyl or C1–4 alkyloxyiminomethyl; naphtyl; pyridinyl; thienyl; furanyl; or thienyl or furanyl substituted with one to three substituents independently selected from C1–C4 alkyl, C1–4 alkyloxy, C1–4 alkylthio, halo, cyano, formyl, acetyl, benzoyl, nitro, C1–C4 alkyloxycarbonyl, phenyl, phenylaminocarbonyl and C1–4 alkyloxyiminomethyl; or (b) a substituent of generic formula

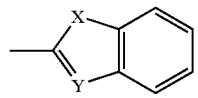

Wherein X is oxygen or sulfur; Y is nitrogen, CH or C(C1–4 alkoxy); and the C6 ring may have one C1–4 alkyl substituent; a second substituent selected from C1–4 alkyl or benzyl being optionally present in position 5 or 6.

Other examples of the metal-free organic compounds include 2,4,5,6-tetrachloroisophthalonitrile, N,N-dimethyl-dichlorophenylurea, 4,5-dichloro-2-n-octyl-4-isothiazoline-3-one, N,N-dimethyl-N'-phenyl-(N-fluorodichloromethylthio)-sulfamide, tetramethylthiuramdisulphide, 3-iodo-2-propinylbutyl carbamate, 2-(methoxycarbonylamino)benzimidazole, 2,3,5,6-tetrachloro-4-(methylsulphonyl)pyridine, diiodomethyl-p-tolyl sulphone, phenyl(bispyridine)bismuth dichloride, 2-(4-thiazolyl)benzimidazole, dihydroabietyl amine, N-methylol formamide and pyridine triphenylborane.

According to a preferred embodiment, the use as antifoulant of the oxathiazines disclosed in WO-A-9505739 has the added advantage (disclosed in EP-A-823462) of increasing the self-polishing properties of the paint.

Among the fouling organisms, barnacles have proved to be the most troublesome, because they resist to most biocides. Accordingly, the paint formulation should preferably include at least an effective amount of at least one barnaclecide, such as cuprous oxide or thiocyanate. A preferred barnaclecide is disclosed in EP-A-831134. EP-A-831134 discloses the use of from 0.5 to 9.9 wt %, based on the total weight of the dry mass of the composition, of at least one 2-trihalogenomethyl-3-halogeno-4-cyano pyrrole derivative substituted in position 5 and optionally in position 1, the halogens in positions 2 and 3 being independently selected from the group consisting of fluorine, chlorine and bromine, the substituent in position 5 being selected from the group consisting of C1–8 alkyl, C1–8 monohalogenoalkyl, C5–6 cycloalkyl, C5–6 monohalogenocycloalkyl, benzyl, phenyl, mono- and di-halogenobenzyl, mono- and di-halogenophenyl, mono- and di-C1–4-alkyl benzyl, mono- and di-C1–4-alkyl phenyl, monohalogeno mono-C1–4-alkyl benzyl and monohalogeno mono-C1–4-alkyl phenyl, any halogen on the substituent in position 5 being selected from the group consisting of chlorine and bromine, the optional substituent in position 1 being selected from C1–4 alkyl and C1–4 alkoxy C1–4 alkyl.

One or more antifoulants selected from such antifoulants are employed in the present invention. The antifoulants are used in such an amount that the proportion thereof in the solids contents of the coating composition is usually from 0.1 to 90% by weight, preferably 0.1 to 80% by weight, and more preferably from 1 to 60% by weight. Too small antifoulant amounts do not produce an antifouling effect, while too large antifoulant amounts result in the formation of a coating film which is apt to develop defects such as cracking and peeling and thus becomes less effective in anti-fouling property.

The paint further contains pigment(s), solvent(s) and additive(s).

The paint composition contains one or more pigments (or fillers).

The paint composition can contain one or more pigments which are "active" pigments, i.e. sparingly soluble in seawater. These pigments have a sea water solubility such that the pigment particles do not survive at the paint surface. These pigments have the effect of inducing the overall smoothing which the relatively-moving sea water exerts on the paint film, minimizing localized erosion and preferentially removing excrescencies formed during the application of the paint. Sparingly soluble pigments have long been used in self-polishing anti-fouling paints. Typical examples are cuprous thiocyanate, cuprous oxide, zinc oxide, cupric acetate meta-arsenate, zinc chromate, zinc dimethyl dithiocarbamate, zinc ethylene bis(dithiocarbamate) and zinc diethyl dithiocarbamate. The preferred sparingly soluble pigments are zinc oxide, cuprous oxide and cuprous thiocyanate. Mixtures of sparingly soluble pigments can be used, e.g. zinc oxide, which is most effective at inducing the gradual dissolution of the paint, can be mixed with cuprous oxide, cuprous thiocyanate, zinc dimethyl or diethyl dithiocarbamate, or zinc ethylene bis-(dithiocarbamate) which are more effective marine biocides; the most preferred is a mixture of zinc oxide with cuprous oxide or thiocyanate.

The paint composition can contain one or more pigments that are highly insoluble in seawater, such as titanium dioxide, talc or ferric oxide. Such highly insoluble pigments can be used at up to 40 percent by weight of the total pigment component of the paint. Highly insoluble pigments have the effect of retarding the erosion of the paint.

The paint composition can contain one or more pigments or dyes that impart a color to the paint, e.g. titanium dioxide, cuprous oxide or iron oxide.

The proportion of pigment to polymer is generally such as to give a pigment volume concentration of at least 25 percent, preferably at least 35 percent, in the dry paint film. The upper limit of pigment concentration is the critical pigment volume concentration. Paints having pigment volume concentrations of up to about 50 percent, for example, have been found very effective.

Examples of the organic solvent include aromatic hydrocarbons such as xylene and toluene; aliphatic hydrocarbons such as hexane and heptane, esters such as ethyl acetate and butyl acetate; amides such as N-methylpyrrolidone and N,N-dimethylformamide; alcohols such as isopropyl alcohol and butyl alcohol; ethers such as dioxane, THF and diethyl ether; and ketones such as methyl ethyl ketone, methyl isobutyl ketone and methyl isoamyl ketone. The solvent may be used alone or in combination thereof.

Solvents are used to obtain the desired viscosity at the expected operating temperature for the application on the ship hull, preferably in the range of 10–50 dPa.s, more preferably of 20–40 dPa.s, most preferably of about 25 dPa.s. Obviously, the nature of the solvents is also adapted to the expected operating temperature for the application on the ship hull, taking into account the desired drying time.

Additive ingredients may optionally be incorporated into the coating composition of the present invention thus prepared. Examples of the additive ingredients are dehumidifiers, and additives ordinarily employed in coating compositions as stabilizers and anti-foaming agents.

EXAMPLES

Methods
Determination of the Solids Content

The solids content of binder solutions was determined by weighing before and after heating a sample for 1 hour at 120° C. [standard test methods ISO 3233/ASTM 2697/DIN 53219].

Determination of the Viscosity

The viscosity of binder solutions and of paints was determined with a Brookfield at 25° C. [ASTM test method D2196-86].

Determination of the Molecular Weight Distribution of the Polymers

The molecular weight distribution was determined by gel permeation chromatography (GPC) with tetrahydrofuran (THF) as solvent and polystyrene as reference. The weight average molecular weight (Mw) and the polydispersity (d=Mw/Mn) are reported in the Tables.

Evaluation of the Thixotropic Factor

The thixotropic factor is determined by measuring the viscosity with a rotation viscosimeter (Haake VT 181) at a low and a high speed. It is defined as the ratio of the viscosity at 5.66 rpm to the viscosity at 181 rpm. [standard methods DIN 53018, 53019, 53214]. The thixotropic factor was measured at standard conditions with paints that all had been thinned down to a viscosity between 11 and 13 dPa.s Evaluation of the Polishing of Paints The erosion rate is the average decrease in film thickness (expressed in um/month) per month over the whole test (1 month=30 days). The minimum duration of the test was 8 months.

Stainless steels discs, 20 cm in diameter, were protected with a standard anti-corrosive system (300 μm in dry film thickness). Two layers of the self-polishing paint to be tested were applied, to give a total dry film thickness between 200 and 300 μm. The tests were carried out in constantly refreshed natural seawater, at a constant temperature of 20° C. The discs were rotated at 1000 rpm, corresponding to about 34 km/hr (18 knots/hr) at 9 cm from the centre.

The total dry film thickness was determined at 7-week intervals, after allowing the paint to dry during one day. It was measured at a number of fixed points, each located at 9 cm from the centre of the discs.

Surface Defects

Surface defects were reported at the end of the polishing test period of all tested samples according ISO 4628/4. The test method was adapted. The to be reported data were reduced to:

the type of surface defects given by the ISO categories;
the size of the cracking has been reduced to two categories:
  a) not visible to the naked eye, represented by a small letter;
  b) visible to the naked eye, represented by a capital letter;

Can Stability

The stability of a paint composition was tested as follows: 250 l of the paint compositions were stored in a can at 40° C. during 6 months.

The paint composition is acceptable if the following is observed:

no large changes in viscosity;
absence of irreversible sedimentation;
no phase separation Preparation of Polymers
I. Preparation of the First Polymer Comprising Monomer Units A.
Polymer PA1.

Polymer PA1 is a 53/47 (w/w) copolymer of tributyltin methacrylate (TBTMA) and methyl methacrylate (MMA). The xylene solution has a Brookfield viscosity of 10.6 dPa.s for a solids content of 56.5%, As determined by GPC, polymer PA1 has a molecular weight of 24100 and a polydispersity of d=2.1

Polymers PA2 and PA3.

"Acid group containing base resins" were prepared following the procedure described in reference examples 1 to 4 of EP-A-0,342,276:

Reference resin R1.

58 parts of ethyl acrylate, 12 parts of butyl acrylate and 30 parts of acrylic acid were polymerised in order to obtain a resinous varnish having a Brookfield viscosity of 4 dPa.s, a solids content of 41.6 wt % and a solids acid value of 233 mg KOH/g.

Reference resin R2.

It was prepared in the same manner as resin R1. 68 parts of ethyl acrylate, 13 parts of butyl acrylate and 19 parts of acrylic acid were polymerised in order to obtain a resinous varnish having a Brookfield viscosity of 0.3 dPa.s, a solids content of 41.1 wt % and a solids acid value of 148 mg KOH/g.

Polymer PA2 was prepared following the procedure described in example 18 of EP-A-0,342,276. The resinous varnish obtained in reference resin R1 was treated with copper acetate and naphtenic acid. The copper acrylate varnish so obtained had a solids content of 43.9 wt % and a Brookfield viscosity of 34 dPa.s.

Polymer PA3 was prepared similarly from reference resin R2; the copper acrylate varnish so obtained had a solids content of 47.4% and a Brookfield viscosity of 11 dPa.s Polymer PA4.

Polymer PA4 was prepared following the procedure described in Examples S-1 to S-6 of EP-A-0,775,733 with 57 wt % of tributylsilylmethacrylate (TBSiMA) and 43 wt % of MMA. Polymer PA4 has a viscosity of 9 dPa.s for a solids content of 56% in xylene. As determined by GPC, the molecular weight was 37600 and the polydispersity d=2.1

II. Preparation of the Second Polymer Comprising Monomer Units B.

Polymer PB1 was obtained by polymerising 65 g of methylacrylate (MA), 25 g of vinylpyrrolidone (VP) and 10 g of butylacrylate (BA) in 100 g of xylene, using TBPEH as initiator.

Properties of Polymers PB1 to PB3 are given in Table A.

III. Preparation of Comparative Polymers

Comparative examples CP1 and CP2 have been prepared according to methods known in the art and disclosed for example in European Patent n° EP B-0,218,573 where monomers A and B are incorporated in the same polymer.

Polymer CP1 has the same monomer composition (and a similar Mw) as the 5:4 mixture of polymers PA1 and PB2 (see Tables A and G)

Polymer CP2 has the same monomer composition (and a similar Mw) as the 5:4 mixture of polymers PA1 and PB1 (see Tables A and G The synthesis of polymers having the same monomer composition as a mixture of polymer PA2 (or PA3) with any of polymers PB was not possible; the reaction with the copper derivative destroyed the lactam ring.

Preparation of Paints

All the paints were prepared according to standard procedures and have the composition in weight percent given in Tables B, C, D and E.

All paints were thinned down to a viscosity between 11–13 dPa.s

The determined paint properties are given in Table E.

TABLE A

| Polymer Code | Composition (w %) | | | | | Properties | | | |
| --- | --- | --- | --- | --- | --- | --- | --- | --- | --- |
| | TBTMA | MMA | BA | MA | VP | w % solids | dPa.s | Mw | d |
| PB1 | 0.0 | 0.0 | 10.0 | 65.0 | 25.0 | 52.1 | 6 | 17700 | 2.6 |
| PB2 | 0.0 | 22.5 | 10.0 | 42.5 | 25.0 | 51.3 | 14 | 36600 | 3.2 |
| PB3 | 0.0 | 18.5 | 10.0 | 41.5 | 30.0 | 52.0 | 13 | 31700 | 2.7 |
| CP1 | 29.4 | 36.1 | 4.5 | 18.9 | 11.1 | 54.5 | 10 | 23000 | 2.7 |
| CP2 | 29.4 | 26.1 | 4.5 | 28.9 | 11.1 | 54.8 | 6 | 20200 | 2.3 |

TABLE B

| Ingredient | Example | | | | | | | | | | | |
| --- | --- | --- | --- | --- | --- | --- | --- | --- | --- | --- | --- | --- |
| | 1 | 2 | 3 | 4 | 5 | 6 | 7 | 8 | C1 | C2 | C3 | C4 |
| PA1 | 16.81 | 6.67 | 23.83 | 17.21 | 6.67 | 23.94 | 16.96 | 13.77 | 30.59 | 0.00 | 31.51 | 0.00 |
| PB1 | 12.85 | 22.30 | 6.57 | 12.94 | 22.57 | 0.00 | 0.00 | 16.17 | 0.00 | 29.94 | 0.00 | 0.00 |
| PB2 | 0.00 | 0.00 | 0.00 | 0.00 | 0.00 | 6.60 | 12.77 | 0.00 | 0.00 | 0.00 | 0.00 | 29.87 |
| DOP | 1.51 | 1.50 | 1.55 | 1.55 | 1.54 | 1.55 | 1.52 | 1.50 | 1.53 | 1.56 | 1.58 | 1.59 |
| Cuprous oxide | 37.90 | 37.60 | 33.42 | 33.57 | 33.28 | 33.45 | 32.91 | 33.00 | 38.49 | 39.30 | 34.06 | 34.46 |
| Iron oxide | 0.90 | 0.90 | 0.93 | 0.93 | 0.92 | 0.93 | 0.91 | 0.92 | 0.92 | 0.94 | 0.95 | 0.96 |
| Chalk | 19.32 | 19.25 | 22.29 | 22.38 | 22.19 | 22.38 | 21.98 | 22.40 | 19.69 | 20.11 | 22.71 | 22.97 |
| Molecular sieve | 1.20 | 1.20 | 1.24 | 1.24 | 1.23 | 1.24 | 1.22 | 1.24 | 1.22 | 1.25 | 1.26 | 1.27 |
| Bentonite | 0.81 | 0.81 | 0.83 | 0.84 | 0.83 | 0.84 | 0.82 | 0.83 | 0.83 | 0.84 | 0.85 | 0.86 |
| Xylene | 8.70 | 9.77 | 9.34 | 9.34 | 10.77 | 9.07 | 10.91 | 10.17 | 6.73 | 6.06 | 7.08 | 8.02 |
| Total | 100.0 | 100.0 | 100.0 | 100.0 | 100.0 | 100.0 | 100.0 | 100.0 | 100.0 | 100.0 | 100.0 | 100.0 |

TABLE C

| Ingredient | C6 | C7 | C8 | C9 | C10 | C11 |
|---|---|---|---|---|---|---|
| CP1 | 31.86 | 31.86 | 31.07 | 0.00 | 0.00 | 0.00 |
| CP2 | 0.00 | 0.00 | 0.00 | 32.51 | 32.40 | 31.59 |
| DOP | 1.59 | 1.59 | 1.55 | 1.63 | 1.62 | 1.58 |
| Thixatrol ST | 0.00 | 0.31 | 0.61 | 0.00 | 0.32 | 0.62 |
| Cuprous oxide | 33.01 | 33.00 | 32.20 | 33.75 | 33.64 | 32.81 |
| Iron oxide | 0.92 | 0.92 | 0.89 | 0.94 | 0.93 | 0.91 |
| Chalk | 22.05 | 21.22 | 19.88 | 22.49 | 21.58 | 20.22 |
| Molecular sieve | 1.22 | 1.22 | 1.19 | 1.25 | 1.24 | 1.21 |
| Bentonite | 0.83 | 0.83 | 0.81 | 0.84 | 0.84 | 0.82 |
| Xylene | 8.52 | 9.05 | 11.80 | 6.59 | 7.43 | 10.24 |
| Total | 100.0 | 100.0 | 100.0 | 100.0 | 100.0 | 100.0 |

TABLE D

| Ingredient | 9 | 10 | 11 | 12 | 13 |
|---|---|---|---|---|---|
| PA3 | 0.00 | 28.53 | 18.66 | 28.05 | 18.24 |
| PB2 | 8.63 | 0.00 | 0.00 | 8.74 | 17.05 |
| PB3 | 0.00 | 8.66 | 17.01 | 0.00 | 0.00 |
| PA2 | 29.90 | 0.00 | 0.00 | 0.00 | 0.00 |
| Cuprous oxide | 35.66 | 36.72 | 36.05 | 36.11 | 35.22 |
| Diuron | 3.89 | 4.01 | 3.93 | 3.94 | 3.84 |
| Titanium oxide | 2.11 | 2.17 | 2.13 | 2.13 | 2.08 |
| Talcum | 4.01 | 4.13 | 4.06 | 4.06 | 3.96 |
| Anti-settling agents | 1.76 | 1.81 | 1.77 | 1.78 | 1.73 |
| Xylene | 14.05 | 13.98 | 16.38 | 15.18 | 17.88 |
| Total | 100.0 | 100.0 | 100.0 | 100.0 | 100.0 |

Example 1

The first polymer PA1, the second polymer PB1 and dioctyl phthalate (DOP) were mixed respectively in solids volume ratio of 5:4:1.

Pigments were added to the composition in an amount of 21 vol %, essentially under the form of $Cu_2O$, that also acted as an antifoulant.

Anti-settling agents (Bentonite) and stabilisers (Molecular sieve) were also added to the paint composition.

The total composition is given in Table B.

Examples 2 to 8

They have been produced similarly to Example 1 by using two separate polymers: the amounts and nature of the two polymers used to prepare the paint composition are summarised in Table B.

Example 9

The first polymer PA2 and the second polymer PB2 were mixed respectively in the volume ratio of 3:1.

Examples 10 to 13

They were obtained using the method described in Example 9. The quantities, components and ratios of Examples 9 to 13 are summarised in Table D.

Example 14

The first polymer PA4 and the second polymer PB2 were mixed respectively in the volume ratio of 1:1. The quantities, components and ratios are summarised in Table E.

TABLE E

| Ingredient | 14 | C5 |
|---|---|---|
| PA4 | 13.18 | 32.63 |
| PB1 | 14.38 | 0.00 |
| DOP | 3.01 | 0.00 |
| Thixatrol ™ ST | 0.00 | 0.67 |
| Cuprous oxide | 36.12 | 35.45 |
| Seanine ™ | 8.39 | 6.45 |
| Zinc oxide | 13.70 | 13.07 |
| Chalc | 0.00 | 0.00 |
| Iron oxide | 1.05 | 0.81 |
| Molecular sieve | 1.40 | 1.07 |
| Bentonite | 0.94 | 0.73 |
| Xylene | 7.83 | 9.12 |
| Total | 100.00 | 100.00 |

Seanine ™ = 4,5-dichloro-2-n-octyl-4isothiazoline-3-one (30 w % solution)

Comparative Examples

For comparison, examples C1 to C5 have been prepared (Tables B and E) wherein one of the two polymers is missing while keeping all other parameters identical. This is reflected in the ratio polymer 1: polymer 2: DOP as shown in Table F.

No thixotropic agent has been added to any of examples 1 to 8 and C1 to C5. Comparative examples C6 to C11 contain only one polymer with both monomeric units A and B. In these examples, various amounts of Thixatrol™ ST were used in order to increase the thixotropy to an acceptable level, respectively 0, 1 and 2 vol %. (Table G)

TABLE F

| Ex. | Polym 1 | Polym 2 | Vol. Ratio Polym 1/ polym 2/ DOP | Thix factor | Volume Solids Cont. % | Polishing µm/month | Defects | Stability |
|---|---|---|---|---|---|---|---|---|
| 1 | PA1 | PB1 | 5:4:1 | 6.2 | 53.9 | 5.4 | h4 | Accept. |
| 2 | PA1 | PB1 | 2:7:1 | 7.7 | 52.3 | 3.5 | h4 | Accept. |
| 3 | PA1 | PB1 | 7:2:1 | 5.8 | 54.3 | 5.2 | none | Accept. |
| 4 | PA1 | PB1 | 5:4:1 | 6.4 | 54.1 | 6.3 | h4 | Accept. |
| 5 | PA1 | PB1 | 2:7:1 | 9.3 | 52.3 | 5.0 | h3 | Accept. |
| 6 | PA1 | PB2 | 7:2:1 | 5.3 | 54.5 | 3.9 | h3 | Accept. |

TABLE F-continued

| Ex. | Polym 1 | Polym 2 | Vol. Ratio Polym 1/ polym 2/ DOP | Thix factor | Volume Solids Cont. % | Polishing μm/month | Defects | Stability |
|---|---|---|---|---|---|---|---|---|
| 7 | PA1 | PB2 | 5:4:1 | 6.1 | 52.1 | 2.8 | h3 | Accept. |
| 8 | PA1 | PB1 | 4:5:1 | 6.7 | 53.4 | 4.8 | h4 | Accept. |
| 9 | PA2 | PB2 | 3:1:0 | 3.2 | 52.7 | 3.3 | — | Accept. |
| 10 | PA3 | PB3 | 3:1:0 | 3.0 | 50.6 | 3.2 | — | Accept. |
| 11 | PA3 | PB3 | 1:1:0 | 3.1 | 52.0 | 3.0 | — | Accept. |
| 12 | PA3 | PB2 | 3:1:0 | 4.0 | 51.8 | 2.6 | — | Accept. |
| 13 | PA3 | PB2 | 1:1:0 | 2.7 | 53.6 | 2.8 | — | Accept. |
| 14 | PA4 | PB1 | 2:2:1 | 3.5 | 53.4 | 6.5 | — | Accept. |
| C1 | PA1 | — | 9:0:1 | 2.5 | 57.0 | 3.8 | h4 | not acc. |
| C2 | — | PB1 | 0:9:1 | 5.6 | 56.5 | 1.4 | detached | not acc. |
| C3 | PA1 | — | 9:0:1 | 1.4 | 57.2 | 4.6 | h5 | not acc. |
| C4 | — | PB2 | 0:9:1 | 5.6 | 55.4 | 0.8 | detached | Accept. |
| C5 | PA4 | — | 10:0:0 | 5.3 | 49.6 | 2.0 | — | Accept |

TABLE G

| C. Ex. | Polymer | Vol. Ratio Polym:DOP | Thix. ST Vol % | Thix factor | Solids Cont. % | Polishing* μm/month | Defects | Stability |
|---|---|---|---|---|---|---|---|---|
| C6 | CP1 | 9:1 | 0 | 1.3 | 53.6 | 3.8 (111) | H5 | not acc. |
| C7 | CP1 | 9:1 | 1 | 2.7 | 53.0 | 3.9 (111) | h5 | not acc. |
| C8 | CP1 | 9:1 | 2 | 5.3 | 50.0 | 7.0 (111) | h5 | not acc. |
| C9 | CP2 | 9:1 | 0 | 1.3 | 56.1 | → | detached | not acc. |
| C10 | CP2 | 9:1 | 1 | 2.6 | 55.1 | → | detached | not acc. |
| C11 | CP2 | 9:1 | 2 | 5.3 | 51.9 | → | detached | not acc. |

*Duration of the test in (days)

Comparison of Table F with Table G shows that the best compromise of desired properties is obtained with the paint compositions of the present invention. In all cases, the thixotropic factor ranges from 2.5 to 10, the solids content is larger than 50 wt % and the self polishing factor is from 3.5 to 6.5. These results are in contrast with the properties exhibited by the paint compositions of the prior art, wherein improving the thixotropic factor resulted in decreasing the solids content and last but not least an unacceptable bad can stability.

These observations can be summarised in pairs of examples wherein the same percentages of monomer units A, B and C were placed
  either on two separate binders, one containing monomer units A and C and the other containing monomer units B and C;
  or on a single binder.

No thixotropic agent was used, 18 vol % of Cu2O was added. DOP was added in the amount of 1 volume part in 10, the remaining 9 parts being either 5 parts of one binder and 4 parts of the other binder for the paint compositions of the present invention, or 9 parts of the single binder for the paint compositions of the prior art. The results are summarised in Table H.

TABLE H

| Ex. | Polymers | | Vol. Ratio Polym:Polym:DOP | Thix factor | Solids Cont. % | Polishing* μ/month | Defects | Stability |
|---|---|---|---|---|---|---|---|---|
| C9 | CP2 | | 9:0:1 | 1.3 | 56.1 | → | detached | not acc. |
| 1 | PA1 | PB1 | 5:4:1 | 6.2 | 53.9 | 5.4 (410) | h4 | acc. |
| C6 | CP1 | | 9:0:1 | 1.3 | 53.6 | 3.8 (111) | H5 | not acc. |
| 9 | PA1 | PB2 | 5:4:1 | 6.1 | 52.1 | 2.8 (288) | h3 | acc. |

*Duration of the test in (days)

What is claimed is:
1. A paint composition comprising:
   a first polymer comprising from 20 to 70 wt % of monomer units A of at least one hydrolysable either tin or silicium ester of an olefinically unsaturated carboxylic acid or salt of copper, zinc, or calcium of an olefinically unsaturated carboxylic acid, the balance being monomer units C selected from the group consisting of esters of ethylenically unsaturated carboxylic acids with $C_1$–$C_{18}$ alcohols, styrene, alpha-methyl styrene, vinyl toluenes, and mixtures thereof;
   a second polymer comprising from 5 to 40 wt % of at least one monomer B selected from the group consisting of the N-vinyl lactam monomers of general formula $CH_2$=CH—NR''''—CO—R', the N-vinyl amides of general formula $CH_2$=CH—N—CO—R'', the monomers of general formula $CH_2$=CR'''—COO—R''''—NR''''—CO—R', the monomers of general formula $CH_2$=CR'''—COO—R''''—N—CO—R'', 2-pyrrolidone-1-isoprenyl ketone, and mixtures thereof, wherein

R' is a n-alkylidene radical having 2 to 8 carbon atoms,
R" is selected from the group consisting of alkyl, cycloalkyl, aryl, alkylaryl and arylalkyl radicals having a maximum of 18 carbon atoms,
R'" is H or $CH_3$,
R"" is a n-alkylidene radical having from 1 to 8 carbon atoms,
R""' is H or R",
the balance being monomer units C selected from the group consisting of esters of ethylenically unsaturated carboxylic acids with $C_1$–$C_{18}$ alcohols, styrene, alpha-methyl styrene, vinyl toluenes, and mixtures thereof;
at least one antifoulant;
the ratio of the first polymer comprising monomer units A to the second polymer comprising monomer units B being of from 95:5 to 10:90.

2. The paint composition of claim 1, wherein the monomer unit A is an organotin ester of an ethylenically unsaturated carboxylic acid.

3. The paint composition of claim 1, wherein the monomer unit A is tributyltin methacrylate.

4. The paint composition of claim 1, wherein the first polymer comprising monomer units A, contains from 30 to 65 wt % of monomer units A.

5. The paint composition of claim 1, wherein the monomer unit A is a salt of copper, zinc or calcium of an olefinically unsaturated carboxylic acid.

6. The paint composition of claim 5, wherein the first polymer comprising monomer units A is a salt of copper, zinc or calcium, obtained by reacting a mixture of
an acid group containing base resin, comprising essentially monomer units C and olefinically unsaturated carboxylic acids monomer units corresponding to monomer unit A;
a salt of copper, zinc or calcium of low bowling organic basic acid, and
a high boiling organic monobasic acid at an elevated temperature while removing the formed low boiling organic basic acid out of the system.

7. The paint composition of claim 1 wherein the first polymer comprising monomer units A has a number average molecular weight of from 1000 to 50000, and contains from 20 to 65 wt % of structural units derived from a trialkylsilyl ester of polymerisable unsaturated carboxylic acid.

8. The paint composition of claim 1, wherein the second polymer comprising monomer units B, contains from 15 to 30 wt % of monomer units B.

9. The paint composition of claim 1 wherein the monomer unit B is N-vinylpyrrolidone.

10. Coating of a ship hull, obtained by applying a paint composition to the ship hull, the paint composition comprising:
a first polymer comprising from 20 to 70 wt % of monomer units A of at least one hydrolysable either tin or silicium ester of an olefinically unsaturated carboxylic acid or salt of copper, zinc, or calcium of an olefinically unsaturated carboxylic acid, the balance being monomer units C selected from the group consisting of esters of ethylenically unsaturated carboxylic acids with $C_1$–$C_{18}$ alcohols, styrene, alpha-methyl styrene, vinyl toluenes, and mixtures thereof;
a second polymer comprising from 5 to 40 wt % of at least one monomer B selected from the group consisting of the N-vinyl lactam monomers of general formula $CH_2$=CH—NR""—CO—R', the N-vinyl amides of general formula $CH_2$=CH—N—CO—R", the monomers of general formula $CH_2$=CR'"—COO—R""—NR""'—CO—R', the monomers of general formula $CH_2$=CR'"—COO—R""—N—CO—R", 2-pyrrolidone-1-isoprenyl ketone, and mixtures thereof
wherein
R' is a n-alkylidene radical having 2 to 8 carbon atoms,
R" is selected from the group consisting of alkyl, cycloalkyl, aryl, alkylaryl and arylalkyl radicals having a maximum of 18 carbon atoms,
R'" is H or $CH_3$,
R"" is a n-alkylidene radical having from 1 to 8 carbon atoms,
R""' is H or R",
the balance being monomer units C selected from the group consisting of esters of ethylenically unsaturated carboxylic acids with $C_1$–$C_{18}$ alcohols, styrene, alpha-methyl styrene, vinyl toluenes, and mixtures thereof;
at least one antifoulant;
the ratio of the first polymer comprising monomer units A to the second polymer comprising monomer units B being of from 95:5 to 10:90.

* * * * *